(12) United States Patent
Venkataswamy et al.

(10) Patent No.: US 9,148,708 B2
(45) Date of Patent: Sep. 29, 2015

(54) AUTOMATED STATUTORY WARNING SYSTEM TO DISPLAY DISCLAIMERS

(71) Applicant: Tata Consultancy Services Limited, Maharashtra (IN)

(72) Inventors: Prashanth Venkataswamy, Karnataka (IN); Goutam Yelluru Gopal, Karnataka (IN); Mariswamy Girish Chandra, Karnataka (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 14/215,490

(22) Filed: Mar. 17, 2014

(65) Prior Publication Data
US 2014/0298380 A1    Oct. 2, 2014

(30) Foreign Application Priority Data
Mar. 28, 2013    (IN) .......................... 1192/MUM/2013

(51) Int. Cl.
| | |
|---|---|
| *H04N 21/81* | (2011.01) |
| *H04N 21/234* | (2011.01) |
| *H04N 21/235* | (2011.01) |
| *H04N 21/4786* | (2011.01) |
| *H04L 29/06* | (2006.01) |

(52) U.S. Cl.
CPC .......... *H04N 21/8133* (2013.01); *H04L 65/605* (2013.01); *H04N 21/235* (2013.01); *H04N 21/23418* (2013.01); *H04N 21/4786* (2013.01)

(58) Field of Classification Search
CPC ... H04N 21/40; H04N 21/812; H04N 21/435; H04N 21/235; H04N 21/44008; H04N 21/4882
USPC ................................... 725/27, 25, 38, 61, 37
See application file for complete search history.

(56) References Cited

U.S. PATENT DOCUMENTS

| | | | |
|---|---|---|---|
| 7,859,419 B2 | 12/2010 | Shen-Kuen et al. | |
| 8,159,539 B2 | 4/2012 | Zhao et al. | |
| 2002/0080161 A1* | 6/2002 | St. Maurice et al. | 345/719 |

(Continued)

FOREIGN PATENT DOCUMENTS

GB    2428472 A    1/2007

OTHER PUBLICATIONS

B. UǦur TÖreyin1, YiǦithan DedeOǦU2, and A. Enis ç Etin1, "Wavelet based real-time smoke detection in video" Mar. 2006.

*Primary Examiner* — Mark D Featherstone
*Assistant Examiner* — Susan X Li
(74) *Attorney, Agent, or Firm* — Thompson Hine LLP

(57) ABSTRACT

Disclosed is a method and system for real time appending at least one electronic message in at least one video stream. The system includes a channel identification module, a signal processing module, a decision module and a message appending module. The channel identification module is configured to identify at least one channel broadcasting the at least one video stream comprising at least one video frame. The signal processing module is configured to perform signal processing analysis on the at least one video frame to detect a plurality of objects associated with at least one content. The decision module is configured to validate the presence of the at least one content by contextually correlating at least one object with at least one other object from the plurality of objects. The message appending module is then configured to append the at least one electronic message in the at least one video stream.

14 Claims, 10 Drawing Sheets

(56) References Cited

U.S. PATENT DOCUMENTS

| | | | |
|---|---|---|---|
| 2009/0089827 A1* | 4/2009 | Carlsgaard et al. | 725/28 |
| 2012/0008830 A1* | 1/2012 | Yoshii | 382/103 |
| 2012/0262583 A1* | 10/2012 | Bernal et al. | 348/164 |
| 2013/0051756 A1* | 2/2013 | Chao et al. | 386/241 |
| 2014/0173650 A1* | 6/2014 | Mathews et al. | 725/32 |

* cited by examiner

AUTOMATED STATUTORY WARNING SYSTEM TO DISPLAY DISCLAIMERS

RELATED APPLICATIONS

This application claims the benefit of Indian patent application No. 1192/MUM/2013, filed Mar. 28, 2013.

TECHNICAL FIELD

The present subject matter described herein, in general, relates to media systems, and more particularly to media systems for appending electronic messages in video streams in response to real time detection of specific content in the video streams.

BACKGROUND

Distribution of media such as multimedia including audio, video, etc. through satellite television and/or cable television have evolved and gained immense popularity in the last few years. The distribution of such media is controlled through a media server located at the service provider's/broadcaster's location. The media distributed may contain objectionable content such as a smoking scene, and associated contents such as an alcoholic scene, etc. The distribution of such objectionable contents is governed by statutory rules and regulations enforced by statutory authorities. The statutory authorities may allow distribution of such objectionable contents only when these are accompanied with statutory warning messages or disclaimers conveying the drawbacks or deficiencies associated therewith.

Conventionally, the service providers or broadcasters have to manually scan the entire video feed to identify one or more video frames containing the objectionable contents. However, the conventional technique of manually identifying the objectionable contents is inefficient and onerous. Further, using the conventional technique, it is very difficult and tedious to manually scan the entire video feeds of television programs, especially tele-serials or reality shows to detect the objectionable content and then accordingly append the disclaimers at the appropriate location on the screen displaying the objectionable content. This may increase in the overall production time and thereby reduce the productivity of the broadcasting contents. Further, manual technique of appending disclaimers may not enable tracking of the number of instances of objectionable contents being broadcasted by a specific program of a specific channel.

Although the detection of smoke in a video feed has been automated and is being used in applications such as surveillance systems, however, the implementation of such automated smoke detection systems may not be useful in detecting objectionable contents in the media distributed through broadcasters/service providers. This is because the smoke detected in the media may not always be related to a smoking scene. For instance, there may be a video feed broadcasting news on fire caused in a particular area, building and forest, etc. Appending the warning disclaimers in context of such video feeds may not be appropriate. Thus, in view of the above, there is need for a system and method that enables real time detection of objectionable contents in a video feed followed by verification of the presence of the objectionable contents. Further, there is a need for a system and method for appending statutory disclaimers in the video feed only when the detection of objectionable contents is verified. Further, there is a need for a system and method for real time tracking of number of disclaimers appended in the one or more video frames of the video feed.

SUMMARY

This summary is provided to introduce aspects related to systems and methods for appending at least one electronic message in at least one video stream broadcasted by at least one broadcasting channel to a user and the aspects are further elaborated below in the detailed description. This summary is not intended to identify essential features of the claimed subject matter nor is it intended for use in determining or limiting the scope of the claimed subject matter.

In one implementation, a system for appending at least one electronic message in at least one video stream broadcasted by at least one broadcasting channel to at least one user in real time is disclosed. The system comprises a processor and a memory coupled to the processor for executing a plurality of modules present in the memory. The plurality of modules comprises a channel identification module, a signal processing module, a decision module and a message appending module. The channel identification module is configured to identify at least one channel broadcasting the at least one video stream, wherein the at least one video stream comprises at least one video frame with at least one content in context of which the at least one electronic message is to be appended. The signal processing module is configured to perform a video/multimedia processing analysis on the at least one video frame of the at least one channel to detect a plurality of objects associated with the at least one content. The decision module is configured to contextually correlate a first object, a second object and optionally at least one other object from the plurality of the objects to validate the presence of the at least one content. The message appending module is configured to append in the real time, the at least one electronic message in the at least one video frame of the at least one video stream when the presence of the at least one content is validated. The memory further comprises a channel logo database adapted to store logos of a plurality of channels subscribed by the at least one user. The channel logo database is configured for extracting one or more features associated with the logos of the plurality of channels from the stored logos. Further, the memory comprises a report generation module configured for generating analytics reports depicting statistical analysis of the at least one electronic message appended in the at least one video stream.

In another implementation, a method for appending at least one electronic message in at least one video stream broadcasted by at least one broadcasting channel to at least one user in real time is disclosed. According to the method, at least one channel broadcasting the at least one video stream is identified. The at least one channel identified comprises at least one video frame with at least one content in context of which the at least one electronic message is to be appended. A signal processing analysis is performed on the at least one video frame of the at least one channel to detect a plurality of objects associated with the at least one content. A first object, a second object and optionally at least one other object from the plurality of the objects are contextually correlated to validate the presence of the at least one content. Finally, the at least one electronic message is appended in the at least one video frame of the at least one video stream when the presence of the at least one content is validated.

In yet another implementation, a computer program product having a non-transitory computer readable storage medium having a computer program for appending at least one electronic message in at least one video stream stored thereon broadcasted by at least one broadcasting channel to at least one user in real time is disclosed. The computer program product comprises a computer readable program code for identifying at least one channel broadcasting the at least one video stream. The at least one channel identified comprises at least one video frame with at least one content in context of which the at least one electronic message is to be appended. The computer program code further comprises a computer readable program code for performing a signal processing analysis on the at least one video frame of the at least one channel to detect a plurality of objects associated with the at least one content. The computer program code further comprises a computer readable program code for contextually correlating a first object, a second object and optionally at least one other object from the plurality of the objects to validate the presence of the at least one content. Finally, the at least one electronic message is appended in the at least one video frame of the at least one video stream when the presence of the content is validated.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer to like features and components.

DETAILED DESCRIPTION

Figure 1:
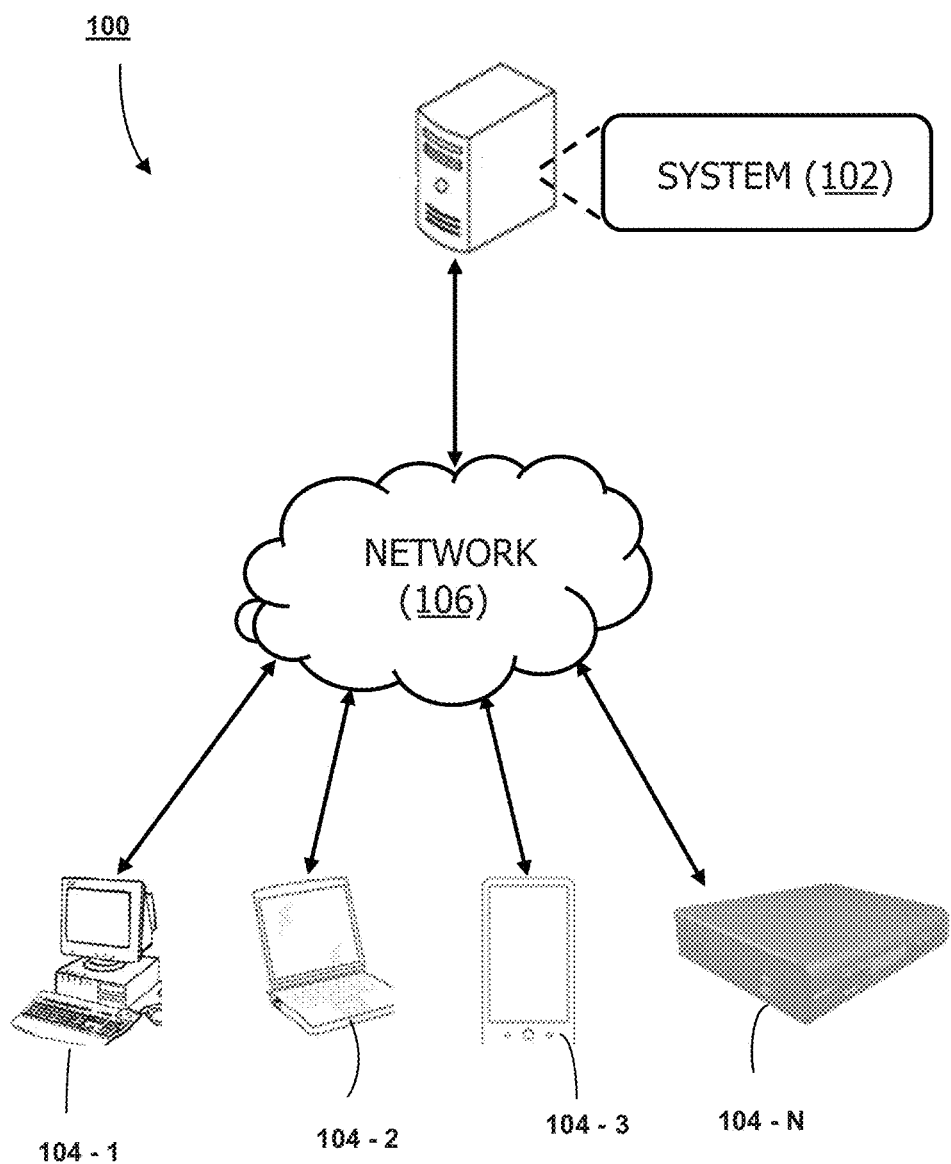
FIG. 1 illustrates a network implementation of a system for real time appending of at least one electronic message in at least one video stream broadcasting by at least one channel in accordance with an embodiment of the present subject matter.

Systems and methods for appending at least one electronic message in at least one video stream such as movie, teleserial, reality show and sport event, etc. to at least one user are described. The at least one electronic message is appended based on detection of at least one content in the video stream. Specifically, the at least one content may be an objectionable content including a smoking scene, an alcoholic scene and combinations thereof. The present subject matter discloses an effective and efficient mechanism for detecting the presence of the at least one content using signal processing techniques such as image/video/multimedia processing techniques. Based on the detection of the at least one content in the at least one video stream, the at least one electronic message is appended in the video stream in real time. Therefore, the electronic message may be dynamically displayed to the user based upon the real time detection of the at least one content.

In order to append the at least one electronic message, at first, at least one channel broadcasting the at least one video stream may be identified, wherein the at least one video stream comprises at least one video frame that includes the at least one content related to smoking and alcohol consumption. The at least one channel is identified by matching the logo of the at least one channel with the logos of a plurality of channels in a channel logo database using at least one matching algorithm selected from a group comprising Artificial Neural Network (ANN), k-nearest neighbor (k-NN), Support Vector Machine (SVM) or combinations thereof.

Subsequent to the identification of the at least one channel broadcasting the at least one video stream, a video/multimedia processing analysis is performed on the at least one video frame to detect a plurality of objects associated with the at least one content. Specifically, the video/multimedia processing is performed to detect the plurality of objects in the at least one video frame. The plurality of objects may comprise a first object, a second object and at least one other object. The first object may comprise at least one of a cigarette, a cigar, a pipe, a glass and a bottle. The second object may comprise at least one of a smoke and a label attached to the glass or the bottle. The at least one other object may comprise at least one of a human face, and a human hand. The detection of the plurality of objects may confirm the presence of the at least one content in the at least one video stream.

After the plurality of objects are detected, a decision is made whether the at least one video frame in the at least one video stream comprises the at least one content. That is, the presence of the at least one content in the at least one video frame is validated by contextually correlating the first object, the second object and optionally the at least one other object from the plurality of objects. Specifically, the at least one video frame may comprise 'cigarette' as the first object and the smoke as the second object. The detection of the cigarette and the smoke validates that the at least one video stream carries the at least one content. Further, the at least one video frame may comprise a human face as the at least one other object, wherein the human face detected may also validate that the at least one video stream carries the at least one content in addition to the cigarette and smoke detection. Alternatively, when the at least one video frame comprises the second object as a 'smoke' and the at least one other object irrelevant to the context of the at least one content, e.g. trees in forest, then it is determined that the at least one video frame does not carry the at least one content. Thus, one or more objects in the at least one video frame may be contextually correlated to each other in order to ensure or validate the presence of the at least one content.

Subsequent to the validation of the at least one content in the at least one video frame of the at least one video stream, the next task is to append the at least one electronic message indicative of statutory warning or a disclaimer in the proximity of the at least one content displayed. Specifically, the at least one electronic message may be in the form of a text, and multimedia such as audio and/or video. Further, a report depicting the number of times the at least one electronic message is appended to the at least video stream can be generated.

While aspects of the described system and method for real time appending of at least one electronic message in at least one video stream displayed to at least one user may be implemented in any number of different computing systems, environments, and/or configurations, the embodiments are described in the context of the following exemplary system.

Referring now to FIG. 1, a network implementation 100 of a system 102 for real time appending of at least one electronic message in at least one video stream displayed to at least one user is illustrated, in accordance with an embodiment of the present subject matter. In one embodiment, the system 102 provides for dynamic, i.e. on the run appending of the at least one electronic message based on the detection of at least one content in at least one video frame of the at least video stream being displayed to the user. In one embodiment, the system 102 identifies the at least one channel configured for broadcasting the at least one video stream based on matching logo of the at least one channel with a plurality of logos corresponding to a plurality of channels stored in a channel logo database. After identifying the at least one channel, the system 102 may monitor the at least one video stream broadcasted by the at least one channel for the presence of the at least one content. The system 102 performs a video/multimedia processing analysis on the at least one video frame of the at least one video stream to detect a plurality of objects associated with the at least one content. The system 102 then contextually correlates a first object, a second object and optionally at least one object with at least one another object from the plurality of objects to validate the presence of the at least one content in the at least one video frame.

Although the present subject matter is explained considering that the system 102 is implemented as a media player on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 ... 104-N, collectively referred to as user 104 hereinafter, or applications residing on the user devices 104. In one embodiment, the system 102 may be installed on the user devices 104. Examples of the user devices 104 may include, but are not limited to, a set-top-box, a portable computer, a personal digital assistant, a handheld device, a television and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
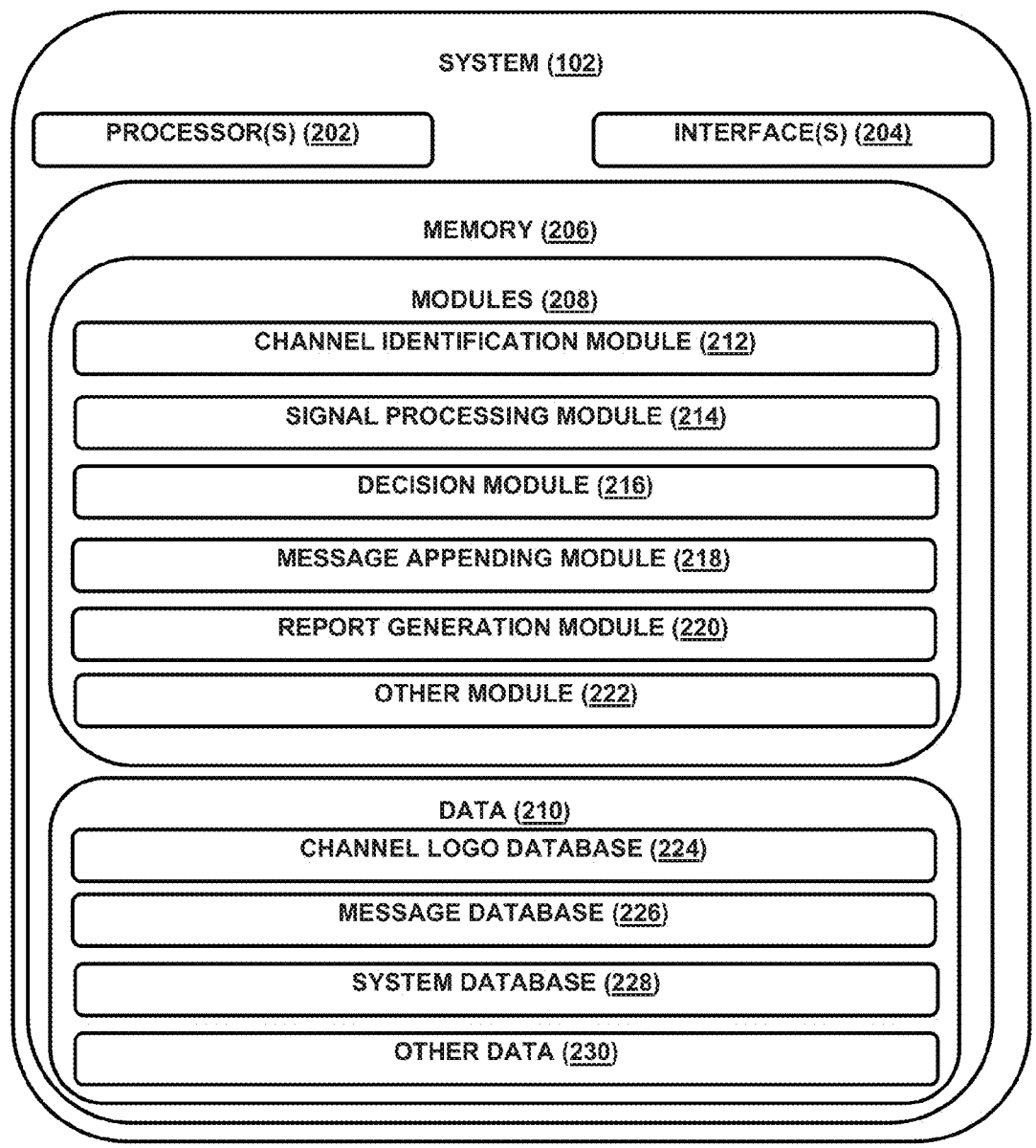
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a channel identification module 212, a signal processing module 214, a decision module 216, a message appending module 218, a report generation module 220 and other modules 222. The other modules 222 may include programs or coded instructions that supplement applications and functions of the system 102.

The data 210, amongst other things, serves as a repository for storing data processed, received, and generated by one or more of the modules 208. The data 210 may also include a channel logo database 224, a message database 226, a system database 228, and other data 230. The other data 230 may include data generated as a result of the execution of one or more modules in the other module 218.

In one implementation, at first, a user may use the user device 104 to access the system 102 via the I/O interface 204. The user may register using the I/O interface 204 in order to use the system 102. The working of the system 102 may be explained in detail in FIG. 3 explained below.

Figure 3:
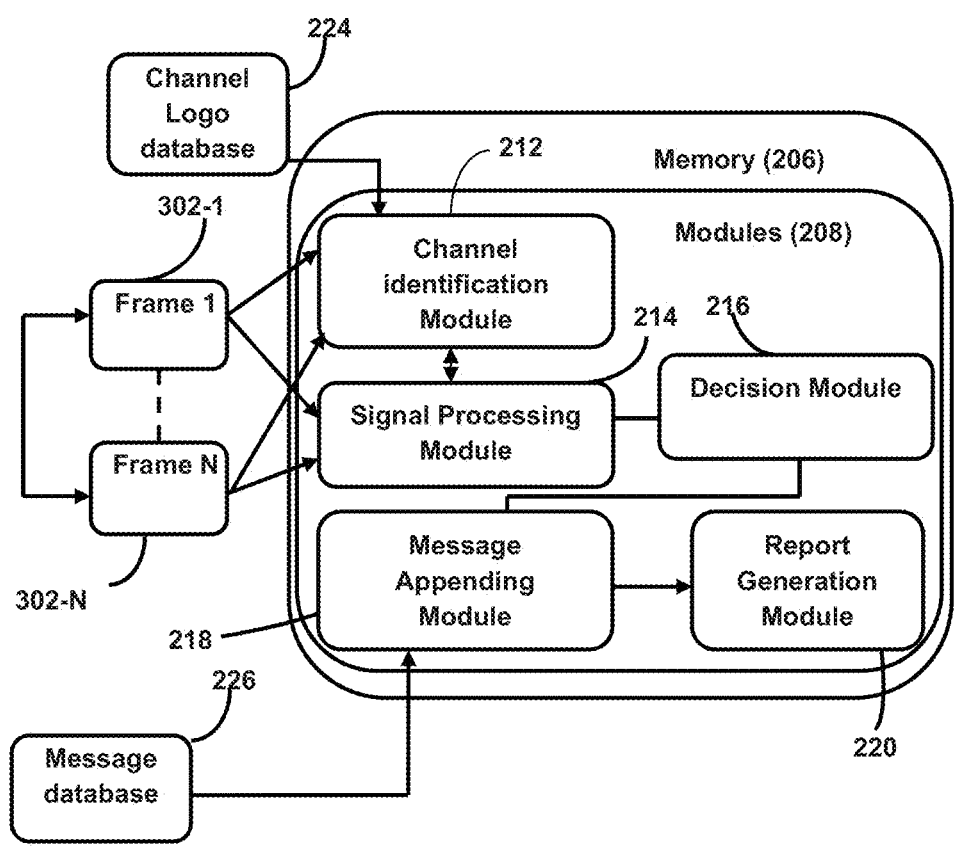
FIG. 3 illustrates a method for real time appending of at least one electronic message in at least one video stream broadcasting by at least one channel, in accordance with an embodiment of the present subject matter.

Referring to FIG. 3, a detailed working of the system 102 is illustrated, in accordance with an embodiment of the present subject matter. As illustrated, a channel logo database 224 shown is adapted to store the logos of a plurality of channels subscribed by the at least one user 104, wherein the plurality of channels are adapted to broadcast a plurality of video streams. In one embodiment, the logos can be stored in raw format. In another embodiment, at least one feature is extracted for each of the logos and accordingly one or more features corresponding to the plurality of channels are stored in the channel logo database 224. In one embodiment, the one or more features extracted for each channel comprise scale invariant feature transform (SIFT) points, Harris points, Haralick features or combinations thereof. The system 102 is adapted to track the plurality of channels being watched by the user over a period of time. Specifically, the logo of each channel is compared with the logos stored in the channel logo database 224 using logo matching algorithm. In one embodiment, the logo matching algorithms for enabling the logo comparison is selected from a group comprising Artificial Neural Network (ANN), k-nearest neighbor (k-NN), Support Vector Machine (SVM) or combinations thereof. The logo matching algorithm is configured to compare one or more features extracted from the plurality of logos of the plurality of channels stored in the channel logo database with one or more features extracted from the logo of each of the channels. This comparison enables filtering of various channels based on the content they render to the at least one user 104. For instance, the channel logo database 224 may provide a filtered list of channels, wherein the plurality of channels broadcasting a plurality of video streams are categorized based on the kind of content they deliver to the at least one user 104. Specifically, the channel logo database 224 may associate the logo of each channel with the type of content it delivers to the user 104. For instance, the channel logo database 224 may categorize the plurality of channels based on the content type into a plurality of categories including but not limited to movies, songs, sports, news, cartoons and religious, etc. This also enables filtering the channels that may broadcast content such as a smoking scene and an alcoholic scene as a result of frequent monitoring of the video streams being watched by the user 104. The channel logo database 224 may comprise a table with multiple rows and columns, wherein the columns include channel name, logo, features of the logo, and category of the channel, etc. that can be maintained.

In one implementation, in response to the receipt of at least one video stream comprising one or more video frames 302-1 . . . 302-N as illustrated, the channel identification module 212 is configured to match the logo appearing in the one or more video frames 302-1 . . . 302-N with the logos stored in the channel logo database 224 to determine whether or not the channel broadcasting the one or more video frames is configured to render the content such as a smoking scene and an alcoholic scene, etc. As a result of such determination, the channel identification module 212 sends a signal to the signal processing module 214. In general, it is assumed that the channels capable of delivering religious, cartoons, and news, etc. may not deliver the content such as a smoking scene and an alcoholic scene, etc. There is a very less probability of these channels being programmed to deliver the content such as a smoking scene and an alcoholic scene, etc. The signal processing module 214 in response to a signal received from the channel identification module 212 is configured for performing video/multimedia processing analysis on the channels capable of rendering the contents such as a smoking scene and an alcoholic scene, etc.

The signal processing module 214 is configured to perform a video/multimedia processing analysis on the one or more video frames 302-1 . . . 302-N in response to the receipt of the signal from the channel identification module 212. The video/multimedia processing analysis may be performed to detect a plurality of objects associated to the content such as a smoking scene and an alcoholic scene. In one embodiment, the plurality of objects may comprise a first object, a second object and optionally at least one other object. The first object may comprise at least one of a cigarette, a cigar, a pipe, a glass and a bottle. The second object may comprise at least one of a smoke and a label attached to the glass or the bottle. The at least one other object may comprise at least one of a human face, and a human hand. The video/multimedia processing analysis is performed to detect the plurality of objects using at least one signal processing algorithm selected from a group comprising face recognition, an object recognition, a smoke detection or combinations thereof. The face recognition algorithm is configured to detect the face of a human in the one or more video frames 302-1 . . . 302-N. Further, human identification or gait identification algorithm can be implemented for detecting the face of the human in case the human face appears occluded in the one or more video frames or does not exist in the one or more video frames comprising the contents such as smoking scenes. The smoke detection algorithm enables detection of smoke in the one or more video frames 302-1 . . . 302-N irrespective of the cause of the smoke. For example, the smoke may be detected due to fire caused in buildings, forests and stadiums, etc. Similarly, the smoke may be caused due to cigarette smoking by at least one person in the one or more video frames 302-1 . . . 302-N. The object recognition algorithm can be implemented for detecting the objects such as a cigar, cigarette and pipe, etc. in the one or more video frames 302-1 . . . 302-N. Thus, the output of the signal processing module 214 is to detect the plurality of objects such as smoke, human face, human hand, cigar, cigarette, glass, bottle and pipe, etc. and provide these to the decision module 216.

Subsequent to the detection of the plurality of objects, the decision module 216 is configured to make a decision on whether or not an electronic message indicative of statutory warning or disclaimer is required to be appended in the one or more video frames 302-1 . . . 302-N. For instance, in one of the video frames, the smoke detected may be due to fire caused in forests. Alternatively, in another video frame, the smoke detected may be due to smoking of a person in the video frame. Thus, the decision module 216 is configured to contextually correlate one or more objects detected by the signal processing module 214. Therefore, in order to validate the presence of the content such as a smoking scene, the decision module 214 may correlate the object such as cigarette/cigar/pipe with the object such as smoke and optionally with the object such as human face. Specifically, the decision module 214 may validate the presence of the smoking scene in the one or more video frames 302-1 . . . 302-N when the object similar to cigarette/cigar is detected around the other object such as smoke. Similarly, the decision module 216 may validate the presence of the alcoholic scene in the one or more video frames 302-1 . . . 302-N when the object similar to glass/bottle is detected along with a label attached therewith around the other object such as human face or the human mouth. Such correlation of the plurality of objects enable validation of the content such smoking scene or an alcoholic scene in the one or more video frames. Based on the output of the decision module 216, a decision is made whether or not the electronic message is required to be appended in the one or more video frames 302-1 . . . 302-N.

As illustrated in FIG. 3, the message appending module 218 is configured to append at least one electronic message in at least one video frame of the one or more video frames 302-1 . . . 302-N when the presence of the content is validated by the decision module 216. More specifically, when the decision module 216 validates the presence of content such as smoking scene or alcoholic scene in the one or more video frames, the message appending module 218 is configured to append the at least one electronic message in the at least one video frame of the one or more video frames 302-1 . . . 302-N. The message appending module 218 is configured to retrieve the at least one electronic message from a message database 226 electronically coupled with the message appending module 218. The message database 226 is configured to store the at least one electronic message in the form of text, audio, video and multimedia, etc. indicative of statutory warning disclaimers. Specifically, the message appending module 218, in response to validation of the smoking scene in the one or more video frames 302-1 . . . 302-N, is configured to append the at least one electronic message such as "CIGARETTE SMOKING IS INJURIOUS TO HEALTH, IT MAY CAUSE CANCER" retrieved from the message database 226 either in audio, video or text form in the at least one video frame broadcasting the smoking scene. Similarly, the message appending module 218, in response to validation of the alcoholic scene in the one or more video frames 302-1 . . . 302-N, is configured to append the at least one electronic message such as "CONSUMPTION OF ALCOHOL MAY RESULT IN PREMATURE DEATH" retrieved from the message database 226 either in audio, video or text form in the at least one video frame broadcasting the alcoholic scene. The report generation module 220 may be configured to generate a statistical report depicting the number of times the at least one electronic message is appended in the one or more video frames 302-1 . . . 302-N.

Figure 4:
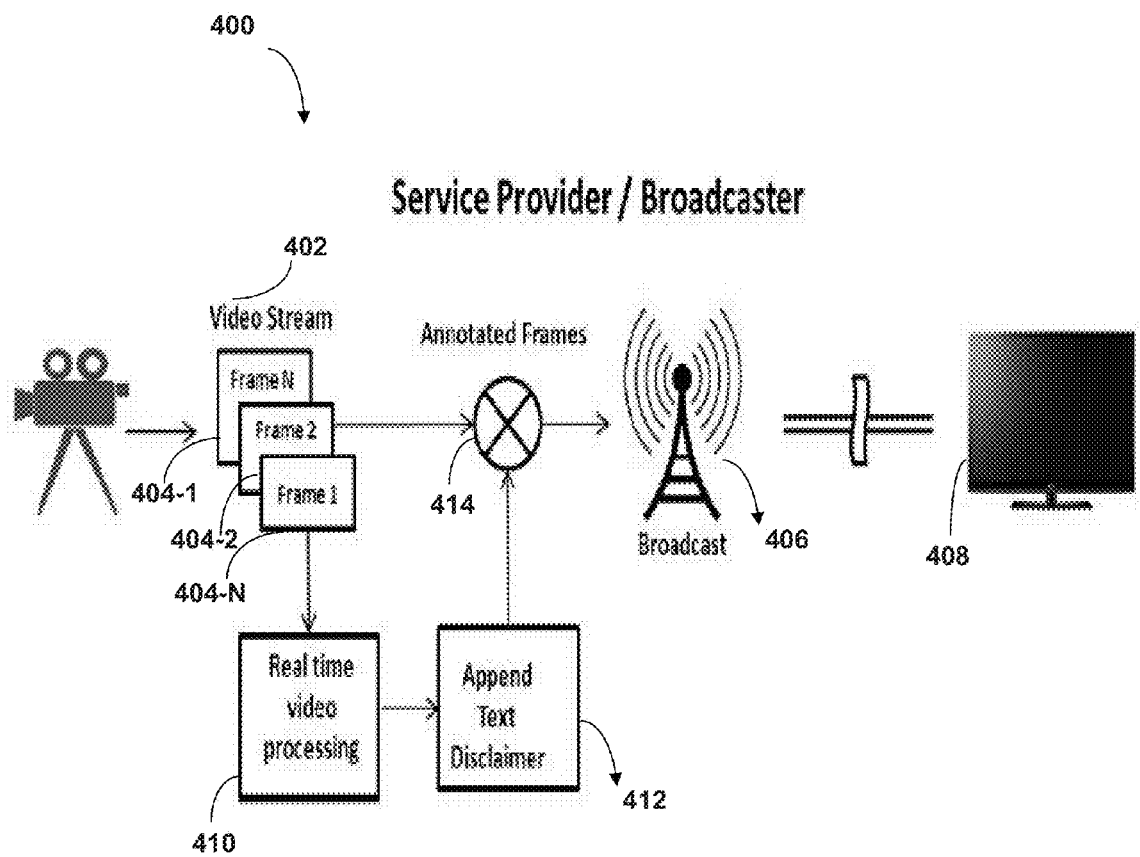
FIG. 4 illustrates the system, in accordance with an exemplary embodiment of the present subject matter.

FIG. 4 illustrates an exemplary embodiment of the present subject matter. In this exemplary embodiment, the system 102 is implemented at service provider's/broadcaster's transmitting server 406 enabling the real time detection of the at least one content such as smoking or alcohol scenes in at least one video stream 402 comprising one or more video frames 404-1, 404-2 . . . 404-N. In this exemplary embodiment, the one or more video frames 404-1, 404-2 . . . 404-N before being broadcasted by the transmitting server 406 to a receiving station 408 is automatically analyzed by the system 102 to detect the at least one content such as a smoking scene or an alcoholic scene. The system 102 configures the signal processing module 214 to perform real time video processing 410 on the one or more video frames 404-1, 404-2 . . . 404-N to detect for one or more objects such as cigarette/cigar/pipe, human face and smoke, etc. Once the one or more objects are detected in the one or more video frames 404-1, 404-2 . . . 404-N, the system 102 may configure the decision module 216 to validate the presence of the at least one content by contextually correlating the cigarette/cigar/pipe, the smoke and optionally the human face from the one or more objects detected. Subsequent to the validation of the at least one content, the system 102 may configure the message appending module 218 to append a text disclaimer 412 in the one or more video frames 404-1, 404-2 . . . 404-N to generate one or more annotated frames 414. The one or more annotated frames 414 comprising the one or more video frames 404-1, 404-2 . . . 404-N with appended text disclaimer 412 are then broadcasted by the transmitting server 406 to the receiving station 408. The receiving station 408 while playing or displaying the one or more video frames 404-1, 404-2 . . . 404-N is configured to display the appended text disclaimer 412 as and when the at least one content occurs in the one or more video frames 404-1, 404-2 . . . 404-N. Thus, implementing the system 102 in the transmitting server 406 enables real time detection of the at least one content such as smoking and/or alcoholic scene in the one or more video frames 404-1, 404-2 . . . 404-N and accordingly append the text disclaimer 412 in the one or more video frames 404-1, 404-2 . . . 404-N without any manual intervention.

Figure 5:
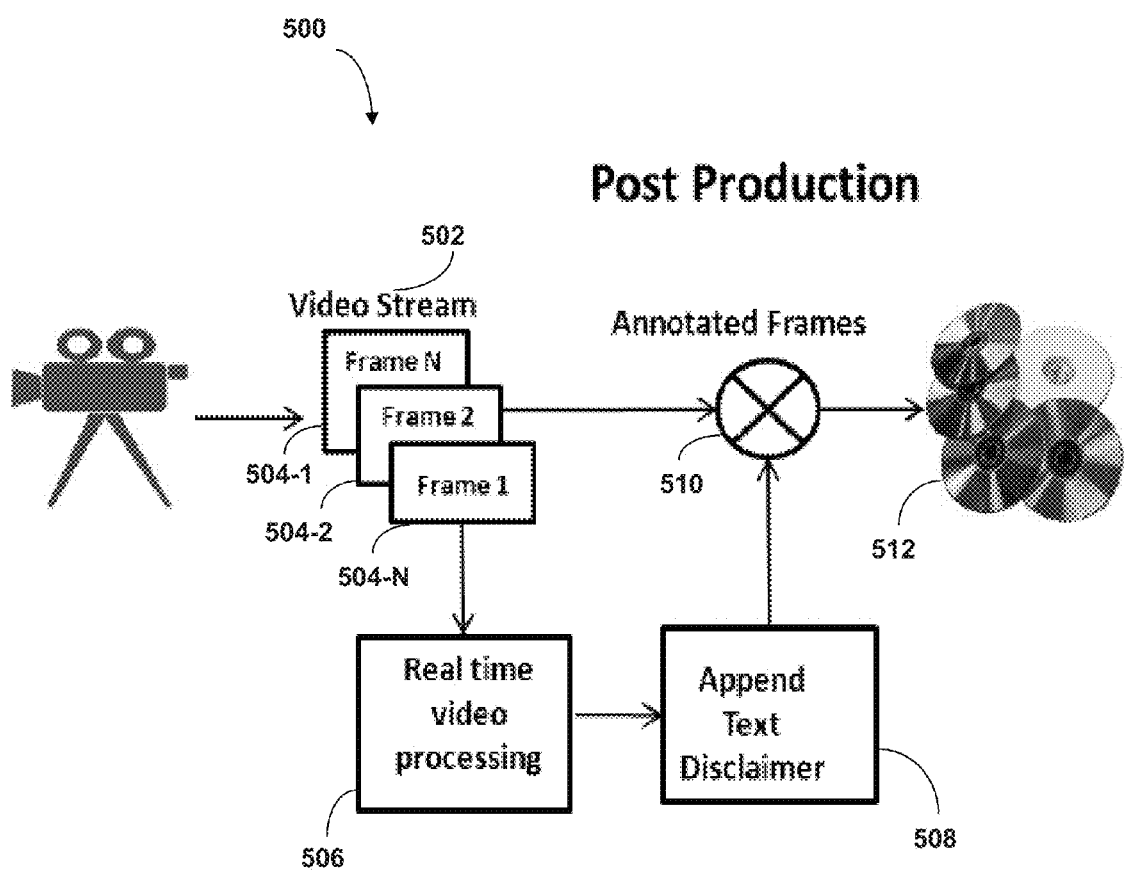
FIG. 5 illustrates the system, in accordance with an exemplary embodiment of the present subject matter.

FIG. 5 illustrates an exemplary embodiment of the present subject matter. In this exemplary embodiment, the system 102 is implemented at distribution server (not shown in figure) configured for producing the copies of videos 512 realized by a video stream 502 that are distributed to the users. In this exemplary embodiment, the copies of videos 512 are automatically scanned for detection of the at least one content such as a smoking ad/or an alcoholic scene before being produced for distribution. The system 102 enables the real time detection of the at least one content such as smoking or alcohol scenes in at least one video stream 502 comprising one or more video frames 504-1, 504-2 . . . 504-N. The system 102 configures the signal processing module 214 to perform real time video processing 506 on the one or more video frames 504-1, 504-2 . . . 504-N to detect for one or more objects such as cigarette/cigar/pipe, human face and smoke, etc. Once the one or more objects are detected in the one or more video frames 504-1, 504-2 . . . 504-N, the system 102 may configure the decision module 216 to validate the presence of the at least one content by contextually correlating the cigarette/cigar/pipe, the smoke and optionally the human face from the one or more objects detected. Subsequent to the validation of the at least one content, the system 102 may configure the message appending module 218 to append a text disclaimer 508 in the one or more video frames 504-1, 504-2 . . . 504-N to generate one or more annotated frames 510. The one or more annotated frames 510 comprising the one or more video frames 504-1, 504-2 . . . 504-N with appended text disclaimer 508 are then utilized by distribution server (not shown in figure) to produce the copies of videos 512. The copies of videos 512 while playing or displaying the one or more video frames 504-1, 504-2 . . . 504-N is configured to display the appended text disclaimer 508 as and when the at least one content occurs in the one or more video frames 504-1, 504-2 . . . 504-N. Thus, implementing the system 102 in the distribution server (not shown in figure) enables real time detection of the at least one content such as a smoking and/or an alcoholic scene in the one or more video frames 504-1, 504-2 . . . 504-N and accordingly append the text disclaimer 508 in the one or more video frames 504-1, 504-2 . . . 504-N without any manual intervention.

Figure 6:
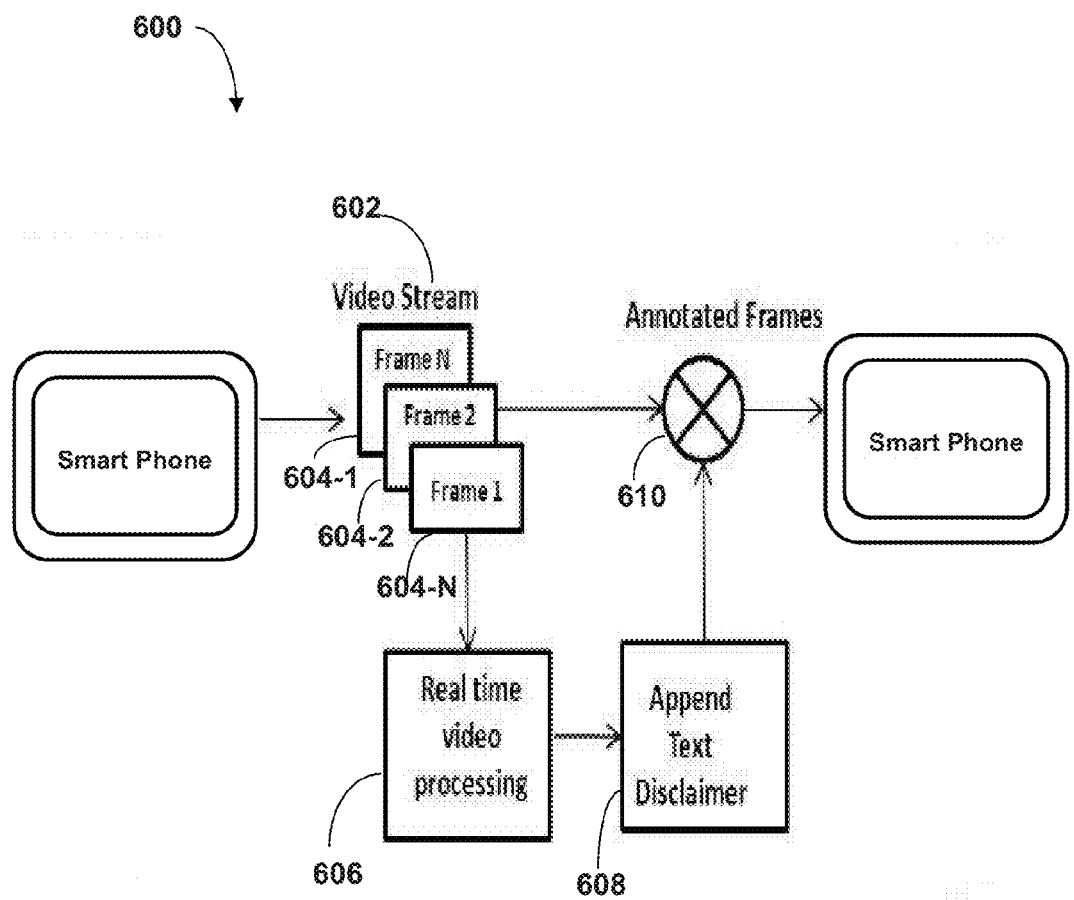
FIG. 6 illustrates the system, in accordance with an exemplary embodiment of the present subject matter.

FIG. 6 illustrates an exemplary embodiment of the present subject matter. In this exemplary embodiment, the system 102 is implemented as a mobile application 600 in a mobile phone. In this exemplary embodiment, the system 102 enables the real time detection of the at least one content such as smoking or alcohol scenes in at least one video stream 602 comprising one or more video frames 604-1, 604-2 . . . 604-N that is streamed on the mobile phone. The system 102 configures the signal processing module 214 to perform real time video processing 606 on the one or more video frames 604-1, 604-2 . . . 604-N to detect for one or more objects such as cigarette/cigar/pipe, human face and smoke, etc. Once the one or more objects are detected in the one or more video frames 604-1, 604-2 . . . 604-N, the system 102 may configure the decision module 216 to validate the presence of the at least one content by contextually correlating the cigarette/cigar/pipe, the smoke and optionally the human face from the one or more objects detected. Subsequent to the validation of the at least one content, the system 102 may configure the message appending module 218 to append a text disclaimer 608 in the one or more video frames 604-1, 604-2 . . . 604-N to generate one or more annotated frames 610. The one or more annotated frames 610 comprising the one or more video frames 604-1, 604-2 . . . 604-N with appended text disclaimer 608 are displayed on the mobile phone as and when the at least one content occurs in the one or more video frames 604-1, 604-2 . . . 604-N. Thus, implementing the system 102 as the mobile application 600 in the mobile phone enables real time detection of the at least one content such as a smoking and/or an alcoholic scene in the one or more video frames 604-1, 604-2 . . . 604-N and accordingly append the text disclaimer 608 in the one or more video frames 604-1, 604-2 . . . 604-N without any manual intervention.

Figure 7:
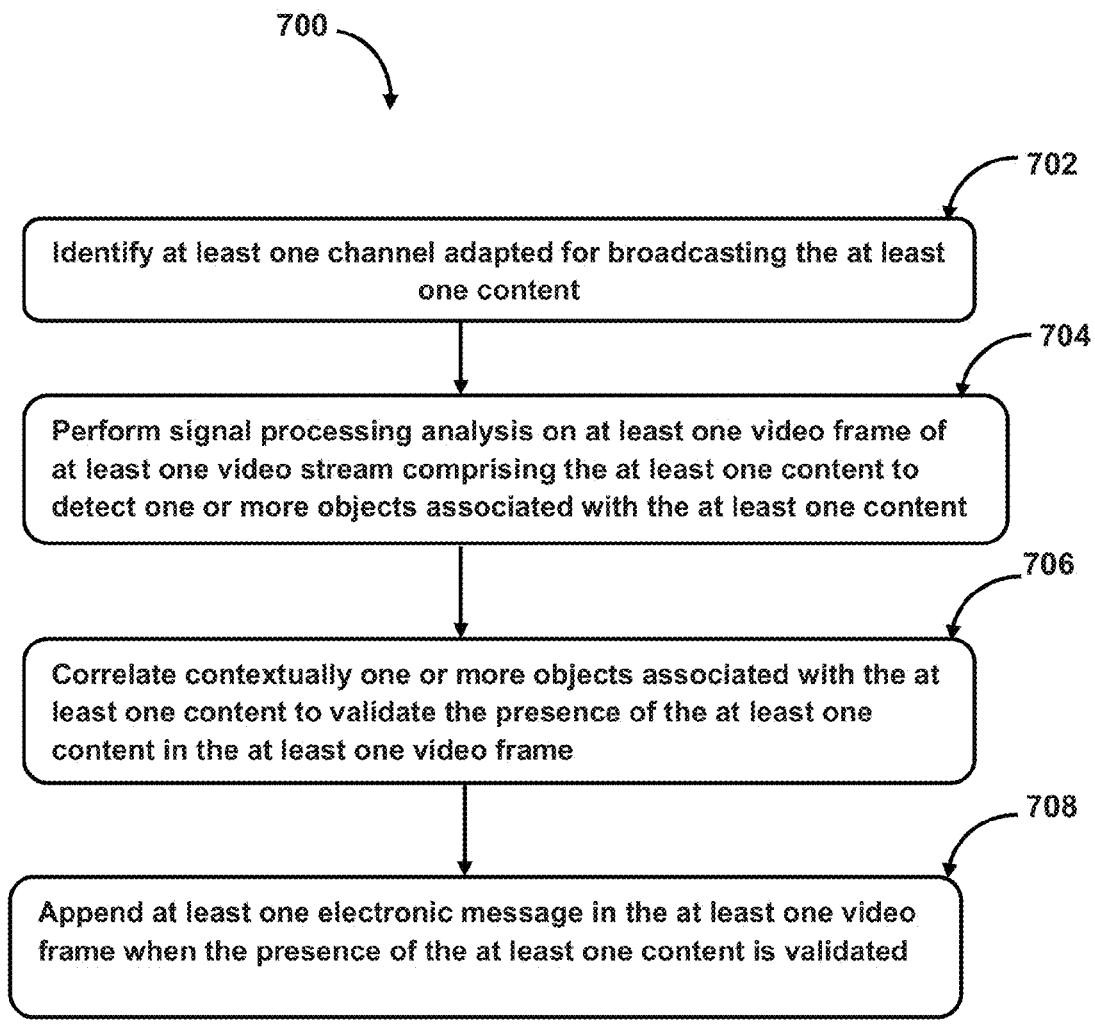
FIG. 7 illustrates a method for real time appending of at least one electronic message in at least one video stream broadcasting by at least one channel, in accordance with an embodiment of the present subject matter.

Referring now to FIG. 7, a method 700 for real time appending of at least one electronic message in at least one video stream broadcasted by at least one channel is shown, in accordance with an embodiment of the present subject matter. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the subject matter described herein. Furthermore, the method can be implemented in any suitable hardware, software, firmware, or combination thereof. However, for ease of explanation, in the embodiments described below, the method 700 may be considered to be implemented in the above described system 102.

At block 702, at least one channel broadcasting the at least one content may be identified. In one implementation, the at least one channel broadcasting the at least one content is identified by the channel identification module 212. Further, the block 702 may be explained in greater detail in FIG. 8.

At block 704, at least one video frame of at least one video stream comprising the at least one content broadcasted by the at least one channel is analyzed. In one implementation, the at least one video frame may be analyzed by the signal processing module 214. Further, the block 704 may be explained in greater detail in FIG. 9.

At block 706, a contextual correlation amongst a plurality of objects detected as a result of signal processing is done to validate the presence of the at least one content in the at least one video frame of the at least one video stream. In one implementation, the plurality of objects may be contextually correlated by the decision module 216. Further, the block 704 may be explained in greater detail in FIG. 10.

At block 708, at least one electronic message indicative of statutory warning or disclaimer is appended in the at least one video stream when the presence of the at least one content in the at least one video stream is validated at block 706. In one implementation, the at least one electronic message is appended by the message appending module 218.

Figure 8:
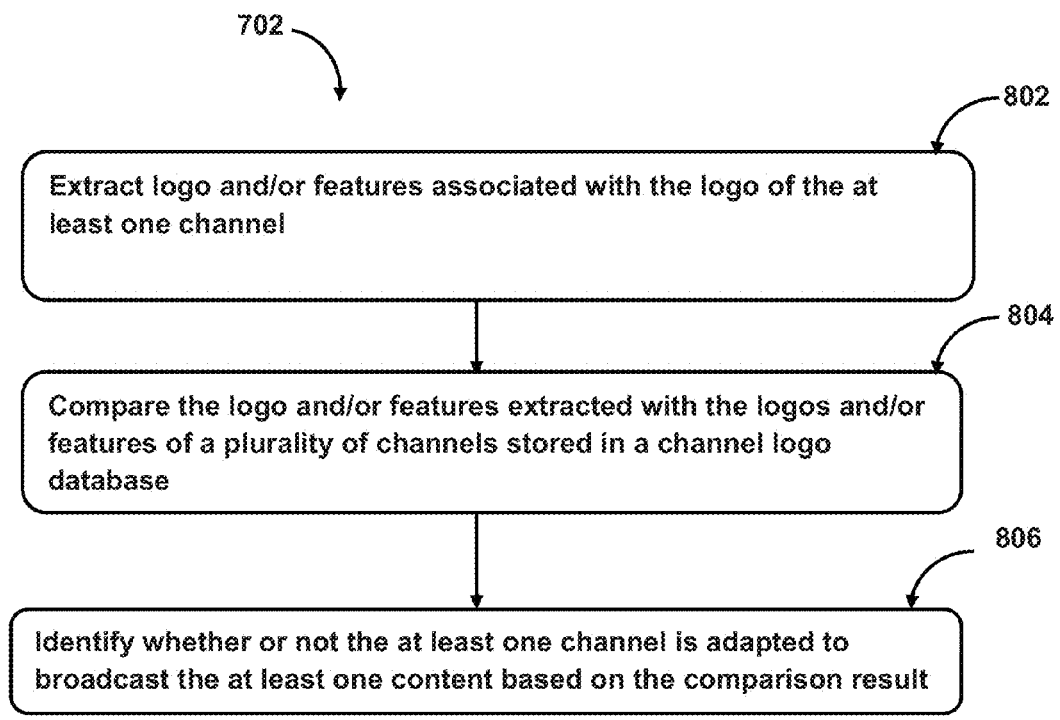
FIG. 8 illustrates a method for identifying the at least one channel, in accordance with an embodiment of the present subject matter.

Referring now to FIG. 8, a method 802 for identifying the at least one channel is shown, in accordance with an embodiment of the present subject matter.

At block 802, logo in raw format or one or more features associated with the logo of the at least one channel are extracted. Some of the features extracted include SIFT points, Harris Points and Haralick features, etc.

At block 804, the logo and/or one or more features extracted for the at least one channel is compared with the logos and/or features associated therewith stored in a channel logo database. In one implementation, the comparison of logo and associated features is implemented using logo matching algorithms such as Artificial Neural Network (ANN), k-nearest neighbor (k-NN), and Support Vector Machine (SVM), etc.

At block 806, based on the result of comparison at block 804, it is determined whether or not the at least one channel is adapted to broadcast the at least one content.

Figure 9:
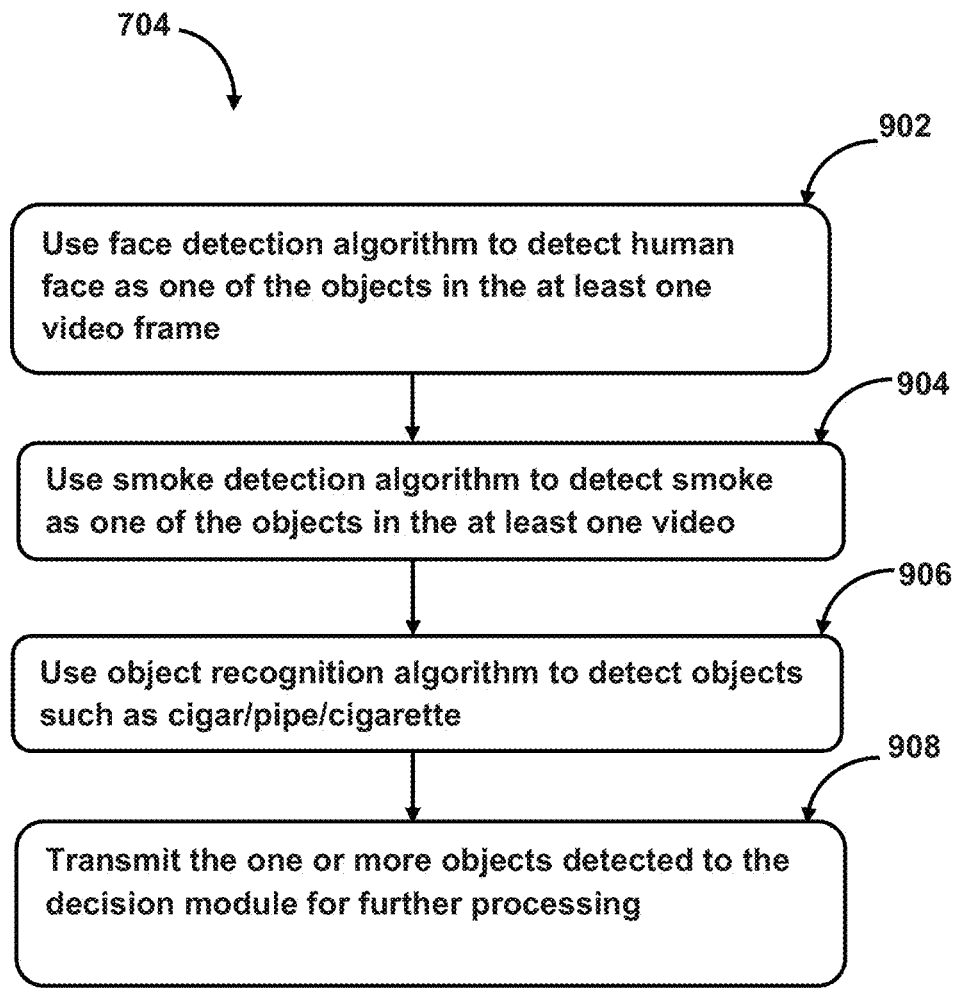
FIG. 9 illustrates a method for signal processing analysis of the at least video frame, in accordance with an embodiment of the present subject matter.

Referring now to FIG. 9, a method 704 for signal processing analysis of the at least one video frame is shown, in accordance with an embodiment of the present subject matter.

At block 902, a face detection algorithm or human/gait identification algorithm may be optionally implemented for determining the presence of at least one object as human face in the at least one video frame.

At block 904, a smoke detection algorithm is implemented for determining the presence of smoke, irrespective of its cause, in the at least one video frame. That is, the smoke caused due to forest fire, cigarette smoking, fire in the buildings, etc. in the video frame may be detected as one of the objects.

At block 906, an object recognition algorithm is implemented to identify one or more objects such as cigar/cigarette/pipe in the at least one video frame.

At block 908, the one or more objects identified in the blocks 902, 904 and 906 are transmitted for further processing to the decision module 216.

Figure 10:
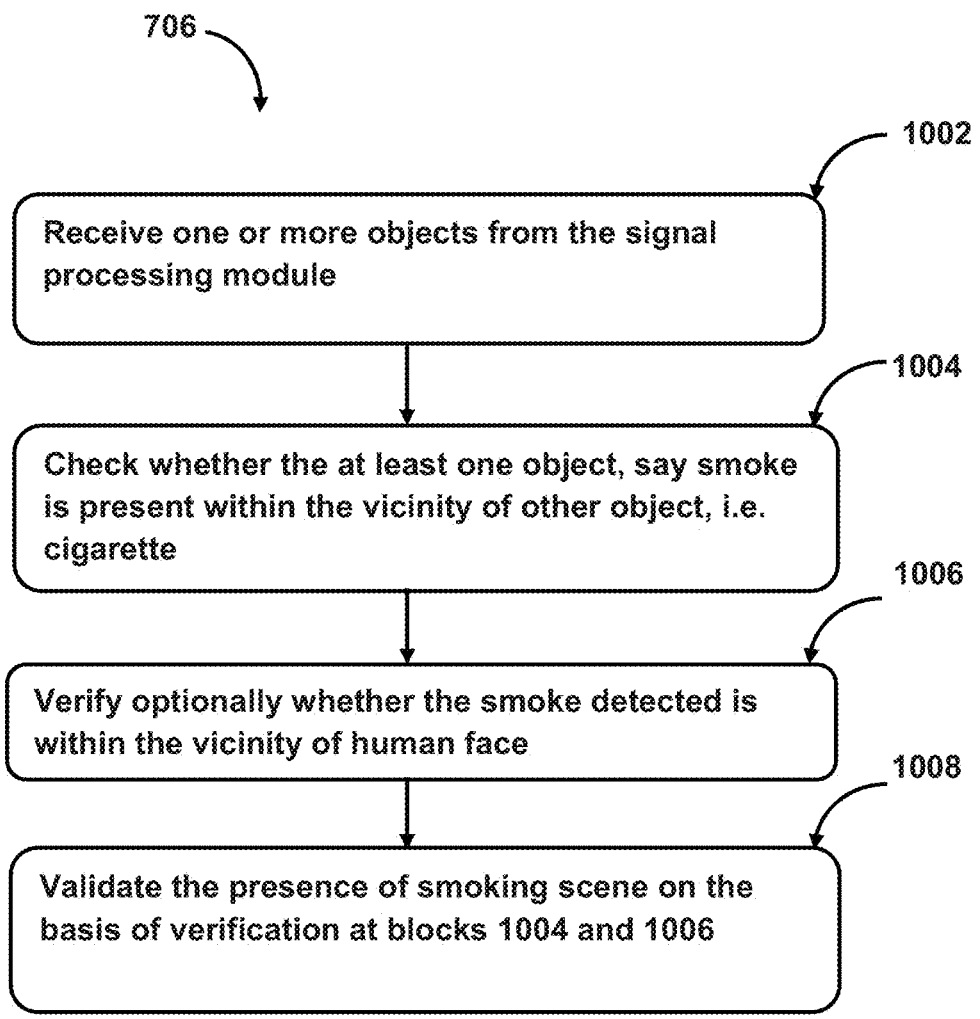
FIG. 10 illustrates a method for validating the presence of the at least one content in the at least one video frame, in accordance with an embodiment of the present subject matter.

Referring now to FIG. 10, a method 706 for validating the presence of the at least one content in the at least one video frame is shown, in accordance with an embodiment of the present subject matter.

At block 1002, one or more objects detected by the signal processing module 214 in the at least one video frame is received by the decision module 216.

At block 1004, a check is performed to ensure that the smoke detected is in the vicinity/proximity of the cigarette/cigar/pipe detected.

At block 1006, an optional verification is done to ensure that the smoke detected is in the vicinity of the human face.

At block 1008, based on checking and verification at blocks 1004 and 1006 respectively, it may be determined that the at least one video frame contains the at least one content that may be a smoking scene.

Although implementations for methods and systems for dynamically appending electronic messages in plurality of video streams based upon detection of contents in the video streams have been described in language specific to structural features and/or methods, it is to be understood that the appended claims are not necessarily limited to the specific features or methods described. Rather, the specific features and methods are disclosed as examples of implementations for real time appending of at least one electronic message in the at least one video stream in response to the detection of the at least one content in the at least one video stream.

Advantages of the System

The present system enables automatic detection of objectionable contents in one or more video streams and accordingly appends statutory disclaimer in context with the objectionable contents in real time.

The present system enables validation of objectionable contents in one or more video streams before appending the disclaimers in the video streams by contextually correlating one or more objects associated with the objectionable contents in a manner such that, the one or more objects are displayed in proximity of each other over the one or more video frames.

The present system enables real time generation of statistical report revealing the show details and the count of times the disclaimer is flashed. Based on the statistical report, the statutory authorities regulating the objectionable content broadcast may then take appropriate actions.

The present system enables increase in overall productivity in production of video content by reducing the time required for manually detecting the objectionable contents in the video stream and accordingly manually appending the disclaimers appropriately.

What is claimed is:

1. A method for appending, in real time, at least one electronic message in at least one video stream characterized in that, the method comprising:
    identifying, by a processor, at least one channel broadcasting the at least one video stream, wherein the at least one video stream comprises at least one video frame with at least one content in context of which the at least one electronic message is to be appended, wherein the at least one channel, broadcasting the at least one video stream, is identified by matching a logo of the at least one channel with a plurality of logos of a plurality of channels programmed to broadcast the at least one content using a logo matching algorithm, wherein the logo matching algorithm compares one or more features extracted from the plurality of logos of the plurality of channels with one or more features extracted from the logo of the at least one channel, and wherein the one or more features, extracted from the plurality of logos and the logo, comprise scale invariant feature transform (SIFT) points, Harris points, Haralick features or combinations thereof;
    performing, by the processor, a signal processing analysis on the at least one video frame of the at least one channel to detect a plurality of objects associated with the at least one content;
    contextually correlating, by the processor, a first object, a second object and optionally at least one other object from the plurality of the objects to validate the presence of the at least one content; and
    appending in the real time, by the processor, the at least one electronic message in the at least one video frame of the at least one video stream when the presence of the at least one content is validated.

2. The method of claim 1, wherein the at least one video stream comprises at least one of a movie, a television program, a reality show, and a sport event.

3. The method of claim 1, wherein the at least one content comprises at least one of a smoking scene, and an alcoholic scene.

4. The method of claim method of claim 1, wherein the logo matching algorithm is selected from a group comprising Artificial Neural Network (ANN), k-nearest neighbor (k-NN), Support Vector Machine (SVM) or combinations thereof.

5. The method of claim 1, wherein the signal processing analysis includes video/multimedia processing analysis, and wherein the signal processing analysis is performed using at least one signal processing algorithm selected from a group comprising of a face recognition, an object recognition, a smoke detection or combinations thereof.

6. The method of claim 1, wherein the first object is at least one of a cigarette, a cigar, a pipe, a glass, and a bottle.

7. The method of claim 1, wherein the first object, the second object and optionally the at least one other object are contextually correlated, in a manner such that, a decision on whether the at least one content is present in the at least one video frame is validated by means of a decision module.

8. The method of claim 1, the at least one electronic message comprises at least one of a text, an audio, a video, and a multimedia.

9. The method of claim 6, wherein the second object is at least one of a smoke, a label attached to the glass, and a label attached to the bottle.

10. The method of claim 9, wherein the at least one other object is at least one of a human face and a human hand.

11. A system for appending, in a real-time, at least one electronic message in at least one video stream, the system comprising:
    a processor; and
    a memory coupled to the processor, wherein the processor is capable of executing a plurality of modules stored in the memory, and wherein the plurality of modules comprising:
        a channel identification module configured to identify at least one channel broadcasting the at least one video stream, wherein the at least one video stream comprises at least one video frame with at least one content in context of which the at least one electronic message is to be appended, wherein the at least one channel, broadcasting the at least one video stream, is identified by matching a logo of the at least one channel with a plurality of logos of a plurality of channels programmed to broadcast the at least one content using a logo matching algorithm, wherein the logo matching algorithm compares one or more features extracted from the plurality of logos of the plurality of channels with one or more features extracted from the logo of the at least one channel, and wherein the one or more features, extracted from the plurality of logos and the logo, comprise scale invariant feature transform (SIFT) points, Harris points, Haralick features or combinations thereof;
        a signal processing module configured to perform a signal processing analysis on the at least one video frame of the at least one channel to detect a plurality of objects associated with the at least one content;
        a decision module configured to contextually correlate a first object, a second object and optionally at least one other object from the plurality of the objects to validate the presence of the at least one content; and
        a message appending module configured to append in the real time, the at least one electronic message in the at least one video frame of the at least one video stream when the presence of the at least one content is validated.

12. The system of claim 11, wherein the channel identification module is electronically coupled with a channel logo database adapted to store the plurality of logos of the plurality of channels.

13. The system of claim 11, wherein the message appending module is further coupled with a report generation module configured for generating analytics reports depicting statistical analysis of the at least one electronic message appended in the at least one video frame of the at least one video stream.

14. A computer program product having a non-transitory computer readable storage medium having a computer program for appending, in real time, at least one electronic message in at least one video stream stored thereon, the computer program product comprising:
    a computer readable program code for identifying at least one channel broadcasting the at least one video stream, wherein the at least one video stream comprises at least one video frame with at least one content in context of which the at least one electronic message is to be appended, wherein the at least one channel, broadcasting the at least one video stream, is identified by matching a logo of the at least one channel with a plurality of logos of a plurality of channels programmed to broadcast the at least one content using a logo matching algorithm, wherein the logo matching algorithm compares one or more features extracted from the plurality of logos of the plurality of channels with one or more features extracted from the logo of the at least one channel, and wherein the one or more features, extracted from the plurality of logos and the logo, comprise scale invariant feature transform (SIFT) points, Harris points, Haralick features or combinations thereof;

a computer readable program code for performing a signal processing analysis on the at least one video frame of the at least one channel to detect a plurality of objects associated with the at least one content;

a computer readable program code for contextually correlating a first object, a second object and optionally at least one other object from the plurality of the objects to validate the presence of the at least one content; and a computer readable program code for appending in the real time the at least one electronic message in the at least one video frame of the at least one video stream when the presence of the at least one content is validated.

\* \* \* \* \*